United States Patent [19]

Nicholson

[11] 4,284,858
[45] Aug. 18, 1981

[54] DICHROIC TRANSDUCER

[75] Inventor: Margie M. Nicholson, San Marino, Calif.

[73] Assignee: Rockwell International Corporation, El Segundo, Calif.

[21] Appl. No.: 101,328

[22] Filed: Dec. 6, 1979

[51] Int. Cl.³ .......................................... H04R 23/00
[52] U.S. Cl. ............................. 179/121 R; 179/138; 455/614
[58] Field of Search .................. 455/614; 179/121 R, 179/138

[56] References Cited

U.S. PATENT DOCUMENTS 3,470,329 9/1969 Young .................................. 179/121 R

FOREIGN PATENT DOCUMENTS 2247032 2/1975 France ...................................... 455/614

Primary Examiner—George G. Stellar
Attorney, Agent, or Firm—H. Fredrick Hamann; Daniel R. McGlynn

[57] ABSTRACT

A dichroic transducer is disclosed including a light source, a film containing a dichroic material in the path of the light beam and an acoustic information-containing wave, and a detector in the path of the modulated light beam for detecting the intensity thereof. The detector may preferably be a fiber optics pickup device.

6 Claims, 8 Drawing Figures

DICHROIC TRANSDUCER

BACKGROUND OF THE INVENTION

1. Field of the Invention

This invention is directed to acoustic transducers, in general, and to transducers which are useful in fiber optics systems in particular.

2. Prior Art

With the recent development of fiber optics techniques in many different types of applications, significant investigations into new fiber optics elements, components and systems are being undertaken. While fiber optics and light pipe techniques have been known for many years, it is only recently that widespread utilization thereof is being considered.

One of the utilizations of fiber optics technology is in the transmission of information from a source to a remote location. This type of transmission is useful in telephone systems and the like. Various techniques have been utilized for supplying data to these information transmission systems. The sources include various devices for applying pulses to the transmission lines. However, not all transmission lines of this type are limited to digital transmission such as the transmission data between computers or other digital systems. In telephone transmission systems, it is desirable to have a microphone or similar acoustic transducer. Likewise, in other analog transmission techniques a microphone or other transducer is desirable.

SUMMARY OF THE INVENTION

Briefly, and in general terms, the invention is concerned with a transducer for fiber optic systems, and more particularly a dichroic microphone. The transducer is formed by a suitable film comprising a dichroic material. The film is deformed under the influence of an acoustic signal (sound wave) applied thereto. The optical absorption characteristics of the film are changed significantly as a result of the deformation. The absorption change is utilized by placing a light source on one side of the film and a fiber optic pickup device on the other side of the film. The analog optical output signal from the pickup device has the same frequency as the acoustic input signal. The optical amplitude is a function of the acoustic amplitude, the dichroic ratio of the light absorbing film, the elastic compliance of the film and the geometry of the transducer. When the film is deformed, the angle of incidence of the applied light is altered so that the light detected by the pickup device is also altered. The optical signal is transferred to a photo detector which drives an a.c. signal processor. The signal processor produces an electrical output signal representative of the optical input signal.

The present invention provides a dichroic transducer comprising light source means for providing a beam of light, a film disposed in the path of the beam of light and containing a dichroic material, the film being stretched or bent so that portions thereof are displaced in response to an incoming information-containing acoustic wave directed at the film; the displaced portions modulating the beam of light directed thereto in accordance with the information contained in the acoustic wave, and detector means disposed in the path of the modulated beam of light for detecting the modulated beam.

DESCRIPTION OF A PREFERRED EMBODIMENT

Figure 1:
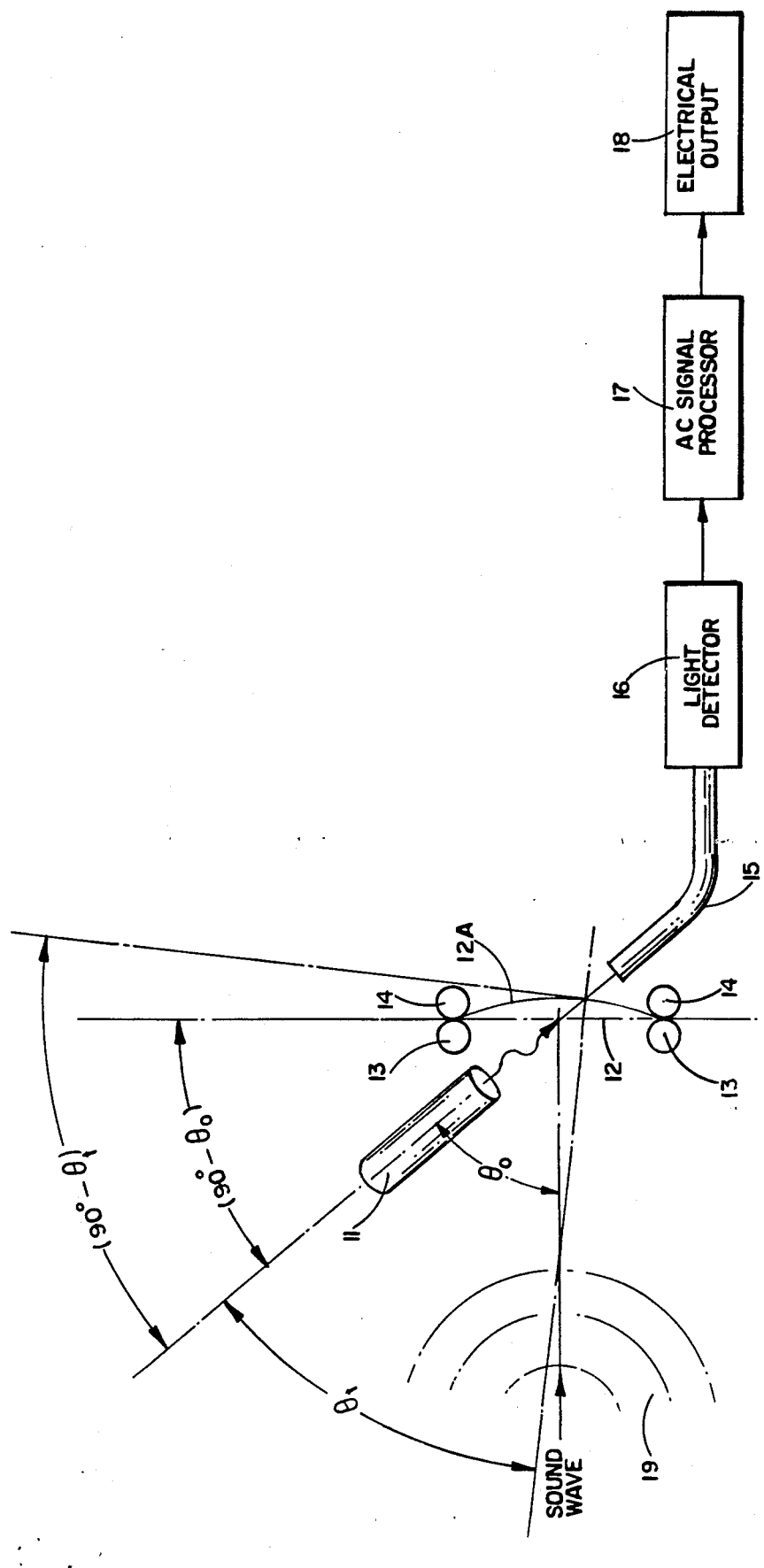
FIG. 1 is a schematic representation of a dichroic microphone in accordance with the instant invention.

Referring now to FIG. 1 there is shown a schematic diagram of a dichroic microphone in accordance with the instant invention. The dichroic microphone (transducer) includes any suitable light source 11. The light source can be a suitable lamp and/or appropriate lens system associated with a source of light. Preferably, light source 11 provides a collimated beam of light which is quite narrow in order to establish accuracy in the signals produced by the transducer. A suitable film 12 (described hereinafter) is mounted in any suitable mounting means such as mounting rings 13 and 14. In some structures, rings 13 and 14 can be portions of the same annular ring. In other structures rings 13 and 14 can be representative of any clamping mechanism which is desired.

On the opposite side of the film from light source 11 is located a suitable fiber optics pickup 15 of which several are known in the art. In point of fact, pickup 15 may be representative of any suitable light sensor in a fiber optics system. The pickup is connected to light detector 16 typically located at a point distant from the film 12 which can be any suitable type of detector mechanism which senses the light which is supplied thereto via pickup 15. Suitable light detectors based on photodiodes, photomultipliers, and photoconductors, are described in a paper by Melchior et al; H. Melchior, M. B. Fisher, and F. R. Arams, "Photodetectors for Optical Communication Systems", Proc. IEEE, 58, 1466 (1970). The output signals produced by light detector 16 are supplied to a.c. signal processor 17. Signal processor 17 can be either a digital or an analog processor in accordance with the techniques and requirements of the remainder of the system with which the transducer is utilized. The output signal from processor 17 is supplied to electrical output device 18 which can be any utilization device such as a computer, a telephone system or the like.

Referring now particularly to film 12, it should be noted that the film can be fabricated of any suitable material which is relatively thin and exhibits a controlled resiliency. For example, film 12 can be fabricated of many common polymers such as polyethylene or polyethylene terephthalate (Mylar). In a preferred embodiment, Mylar is utilized because it is known to be strongly molecularly oriented when stretched. However, Mylar is essentially colorless and in order to create a strong dichroic response in the visible region of the spectrum, a colored compound may be incorporated into the film. Many colored organic compounds may be used for this purpose. One suitable example is 1-amino-4-hydroxyanthraquinone, which is a dye that is known in the art to dissolve in Mylar. In addition, various phthalocyanine dyes, which are strongly dichroic, as well as condensed-ring aromatic hydrocarbons and their derivatives can be utilized. The relatively flat, colored molecules of the dyes tend to become oriented alongside the molecules of the polymer film when it is stretched. Consequently, the absorption spectrum observed in the film will be very dependent upon the angle of the incident light onto the film.

Thus referring again to FIG. 1, if light from light source 11 is applied to film 12 in the unstretched condition, the angle of incidence is $\theta_0$. This angle is measured between the axis of the light source (assuming a narrow beam of light) and a line perpendicular to the plane of unstretched film 12. However, when a sound wave 19 from acoustic source is applied, the pressure of sound wave 19 causes film 12 to stretch to the bowed position indicated by line 12a. As a consequence, the angle of incidence in the stretched-film condition is $\theta_t$. This angle is measured between the axis of light source 11 and a line perpendicular to a tangent to the stretched film 12a at the point of incidence of the light beam from source 11. Thus it is clear that the angle $\theta_t$ and its complement $(90°-\theta_t)$ vary as functions of the pressure exerted by sound wave 19.

As the position of film 12 is varied (for example, to the stretched position indicated by reference numeral 12a), the angle of incidence changes and consequently the absorption characteristics of the film are changed. As a result the amount or intensity of light which is transmitted from source 11 to light detector 16 via film 12 and pickup 15 is significantly varied. The light detector 16 is affected thereby and supplies appropriate signals to a.c. signal processor 17 which produces an appropriate output signal in response to the light detected. The light detected is clearly a function of the position of film 12 which is a function of the acoustic signal applied thereto.

Figure 2A:
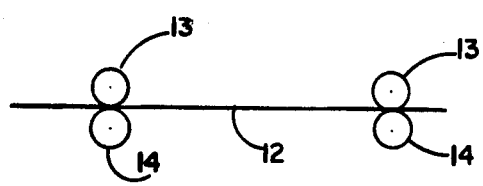
FIGS. 2a and 2b show schematically the stretchable film and the molecular arrangement thereof in an unstretched condition.
Figure 2B:
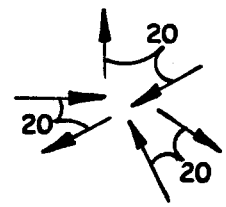

Referring now to FIGS. 2a and 2b, there is shown an unstretched film 12 mounted between suitable mounting devices such as rings 13 and 14. With this condition of film 12, the molecular structure indicated in FIG. 2b shows randomly oriented molecules (represented by arrows 20) which establish certain light absorption characteristics within film 12.

Figure 3A:
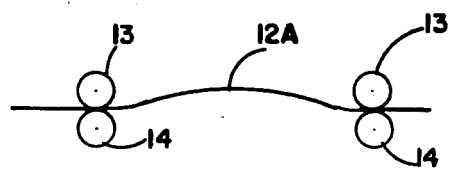
FIGS. 3a and 3b show schematically a stretched film and the molecular alignment thereof.
Figure 3B:
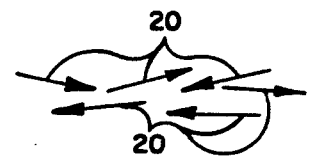

Referring now to FIGS. 3a and 3b, there is shown stretched or deformed film 12A, and the molecular arrangement therein, respectively. In FIG. 3a, mounting rings 13 and 14 are shown to support the film. However, the film 12A has been deformed as a result of the application of an acoustic sound wave (see FIG. 1). As a result of the stretching of the film, the arrows 20 are more nearly aligned in the direction of the stretching, as shown in FIG. 3b. The arrows or molecules may be arranged in opposite directions but the orientation is altered thereby causing the absorption characteristics of the film to be altered also. As noted, the molecules of the dye, when utilized, are also aligned with the molecules of the film thereby creating a parallel orientation arrangement and effect.

Figure 4:
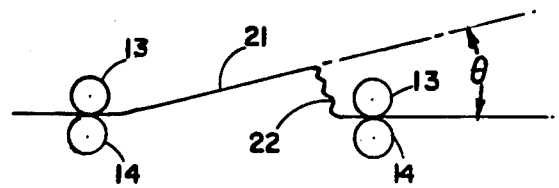
FIG. 4 shows a schematic diagram of a tilting diaphragm sensor.

Referring now to FIG. 4 there is shown a modified diaphragm sensor used with the apparatus shown in FIG. 1. This embodiment of the sensor is referred to as a tilting diaphragm sensor. Again, mounting devices 13 and 14 are utilized to clamp the dichroic film which can be of the type described supra. In this case film 21 includes a bellows section 22 between the mounting devices. This arrangement permits film 21 to flex more freely in response to an acoustic signal. Moreover, by permitting one end of the film to move more readily, a different angular arrangement represented by the angle $\theta$ can be established for the film. That is, the tangential relationship of the film to the light beam is not nearly as significant.

Figure 5:
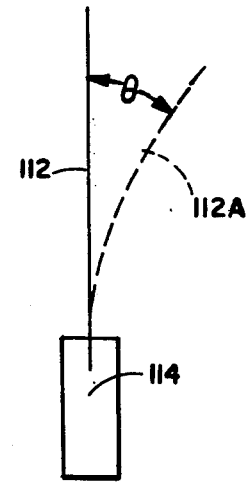
FIG. 5 is a schematic representation of a vibrating reed sensor.

Referring now to FIG. 5 there is shown an alternative approach to the dichroic film device. In this embodiment, the film is provided in the form of a free-ended, vibrating dichroic reed 112. Reed 112 is mounted in a fixed base 114 which is equivalent to the mounting apparatus 13-14 in FIG. 1. Again, as the acoustic sound wave is applied, reed 112 bends and vibrates as indicated by dashed line 112a. This arrangement has the same net effect as described supra.

Figure 6:
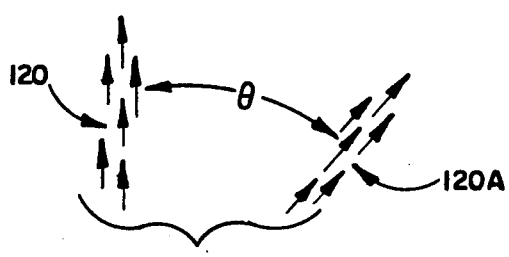
FIG. 6 is a representation of the action of an array of permanently aligned molecules useful in the devices in FIGS. 4 and 5.

Referring now to FIG. 6, there is shown a schematic diagram of the molecular orientation and operation relative to the embodiments shown in FIGS. 4 and 5. That is, a plurality of arrows 120 schematically represent the permanently aligned molecules which can be provided in certain types of reeds or films. The arrow group 120 is indicative of the reed or film in a particular position, for example the rest position. When an acoustic signal or sound wave is applied, the reed, film or diaphragm of one of the embodiments shown and described above, is caused to be deflected. However, the molecular alignment plane moves with the film, reed or diaphragm and effectively tilts through an angle $\theta$ as indicated by grouping 120a. Movement of these particular planes move by an angle $\theta$ which is shown in FIGS. 4 and 5 affects the absorption characteristics as noted above.

Thus there has been shown and described a simple, compact, and inexpensive transducer useful in acoustic systems such as for voice transmission or the like. This kind of device can be used in telecommunications equipment, digital audio processing, underwater sound detection or any other applications. it is believed to be more sensitive and more reliable than a microphone structure based on changes in electrical conductivity of non-porous single phase (or composite) solid structures with pressure. The device as described utilizes a suitable film, diaphragm or reed which alters its light absorption when moved. The sensitivity of the device can be increased by the use of a monochromatic or filtered light at a wavelength which corresponds to the maximum dichroic response of the film. In addition, with proper choice of materials, incident light, incident light angle, and detector, the device can be made to operate at visible, ultraviolet or infrared wavelengths. In addition, in the embodiment shown in FIG. 1, while it is not required, it is preferred in some designs that the incident light be applied at an angle of incidence greater than 0° to the film. With the greater angle, the detector can sense a tilting effect in the film as well as an increased molecular alignment due to stretching.

While certain details and materials are specified, it should be understood that these items are intended to be illustrative only and are not intended to be limitative. Those skilled in the art will conceive modifications to the device specified. However, any such modifications which fall within the purview of this description are intended to be included herein as well. The scope of this invention is limited only by the claims appended hereto.

Having thus described the preferred embodiment of the invention, what is claimed is:

1. A dichroic transducer comprising:
   light source means for providing a beam of light;
   a film comprising a dichroic material disposed in the path of said beam of light, said film being stretched so that portions thereof are displaced in response to an incoming information-containing acoustic wave directed at said film, said displaced portions modulating said beam of light directed thereto in accordance with the information contained in said acoustic wave; and
   detector means disposed in the path of said modulated beam of light for detecting said modulated beam.

2. A transducer as defined in claim 1, wherein said film is composed of Mylar containing a dichroic compound.

3. A transducer as defined in claim 2, wherein said dichroic compound is a phthalocyanine dye.

4. A transducer as defined in claim 2, wherein said dichroic compound is 1-amino-4-hydroxyanthraquinone.

5. A transducer as defined in claim 1, wherein said detector means comprises a fiber optic pickup device.

6. A transducer as defined in claim 5, wherein said pickup device is connected to a photodetector.

* * * * *